April 20, 1926.

H. BALDWIN 1,581,666

COMBINATION SALT AND PEPPER SHAKER

Filed Dec. 6, 1922

Inventor

*Herbert Baldwin*

By

*Hean Kelly*, Attorney

Patented Apr. 20, 1926.

1,581,666

UNITED STATES PATENT OFFICE.

HERBERT BALDWIN, OF MOUNTAIN, WISCONSIN; FLORENCE BALDWIN EXECUTRIX OF SAID HERBERT BALDWIN, DECEASED.

COMBINATION SALT AND PEPPER SHAKER.

Application filed December 6, 1922. Serial No. 605,226.

*To all whom it may concern:*

Be it known that I, HERBERT BALDWIN, a citizen of the United States, residing at Mountain, in the county of Oconto and State of Wisconsin, have invented certain new and useful Improvements in Combination Salt and Pepper Shakers, of which the following is a specification.

This invention is directed to improvements in condiment holders and provides a combination salt and pepper shaker having novel means of dispensing the contents therefrom.

A further and additional object of the invention is to provide a combination salt and pepper shaker which can be readily and easily filled or taken apart for cleaning or repairs.

Various other objects and advantages of the invention will become apparent from the following description.

Figure 1:
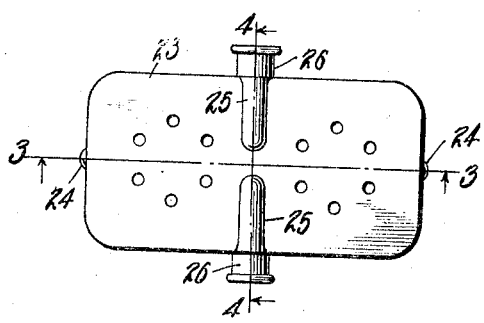
Figure 1 is a top plan view of the proposed device.

This condiment holder may be constructed of glass, metal or any other suitable material and comprises a casing 10 having spaced compartments 11 and 12 extending longitudinally therethru from the top to the bottom and on opposite sides of the center as is shown; the material of the casing intervening between the said compartments constituting a central wall or partition 13. Compartments 11 and 12 are adapted to contain the salt and pepper which is inserted therein thru the bottom opening, suitable screw plugs 14 and 15 being removably threaded into the compartments to close the openings. Each plug is provided with a recessed outer face presenting a finger gripping portion 16 to facilitate its insertion in, or removal from, the compartment.

Each compartment 11 and 12 has its upper end counterbored to receive the depending collar 17 of a perforated shutter disk 18, which disc is provided with a radially projecting finger 19 having a longitudinally extending slot 20.

Figure 2:
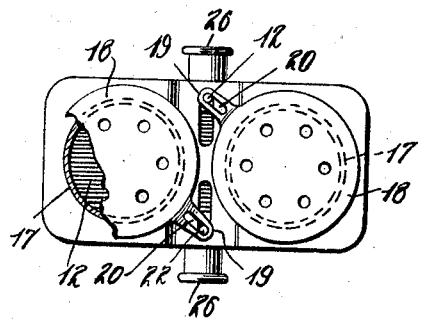
Figure 2 is a similar view thereof with the cap plate removed to disclose the perforator shutters.
Figure 3:
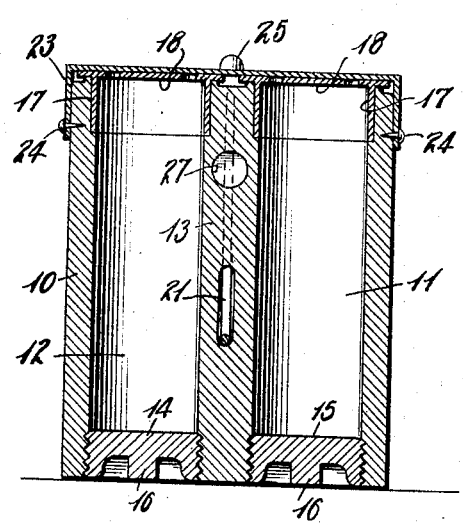
Figure 3 is a vertical central longitudinal section.
Figure 4:
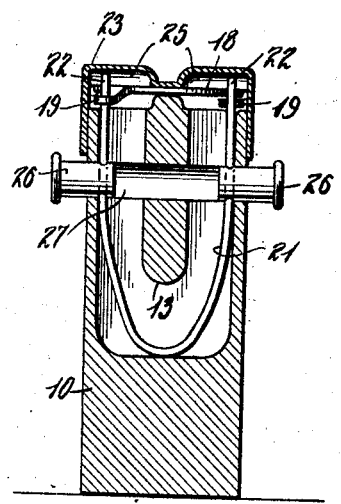
Figure 4 is a vertical cross section thru the center of the holder.

Engaged in a U-slot in the partition wall 13 of the casing, as shown to advantage in Figure 4, is a suitable U-shaped spring 21 having its two arms 22 extending upwardly beyond the top of the casing for insertion thru the slots 20 of the shutter arms 19, the two shutters being arranged as shown in Figure 2. The spring is so flexed that the arms thereof bear against the outer walls of the U-slot and position the shutters so that perforations therein are out of alignment with the perforations of the cover 23 which is arranged over the upper end of the casing. Cover 23 may be fastened to the casing in any suitable manner, as indicated at 24, and is provided with raised channeled portions 25 extending inwardly from opposite sides thereof and at a central point to provide guides for the upper ends 22 of spring 21. It will thus be seen that the arms of the spring are movable laterally of the inner wall of the respective compartments and transversely of the cover for bringing the perforations of the shutters in line with the perforations of the cover whereby the contents of the compartments may be readily dispensed therethru as desired and to facilitate the flexing of the spring to bring about such a result, each arm of the latter is provided with a push button 26 operating in an opening 27 extending transversely thru the partition from one end thereof to the other, the said button projecting a slight distance beyond the ends, as illustrated. Shutters 17 may be operated separately or jointly by pressing upon either one or both buttons and the quantity dispensed from each compartment may, of course, be regulated by varying the degree of registration between the perforations of the said shutters and perforations of the said cover.

From the foregoing it is thought that the advantages and novel features of the invention can be readily understood and that further detail description thereof is unnecessary.

What is claimed is:

A condiment holder comprising a casing having a transverse partition dividing the same into separate compartments, said partition being hollowed vertically of its opposite ends and transversely of its bottom to provide a U-shaped slot, a U-shaped spring engaged in the said slot with its arms extended above the partition and adapted for movement in a direction laterally of the inner walls of the respective compartments, a cover having perforated portions arranged over the respective compartments and presenting raised guide-channels engaged over the extended ends of the said spring, rotary shutters seated in the upper ends of the respective compartments and below the perforated portions of the said cover, said shutters being connected to the arms of the said spring for actuation thereby, and push buttons slidably engaged in openings communicating with the U-slot through opposite ends of the said partition, said push buttons having their inner ends operatively connected with the respective arms of the said U-shaped spring.

In testimony whereof I affix my signature.

HERBERT BALDWIN.